No. 845,570. PATENTED FEB. 26, 1907.
J. L. PAUL.
FASTENING DEVICE FOR ORNAMENTS.
APPLICATION FILED MAR. 31, 1906.
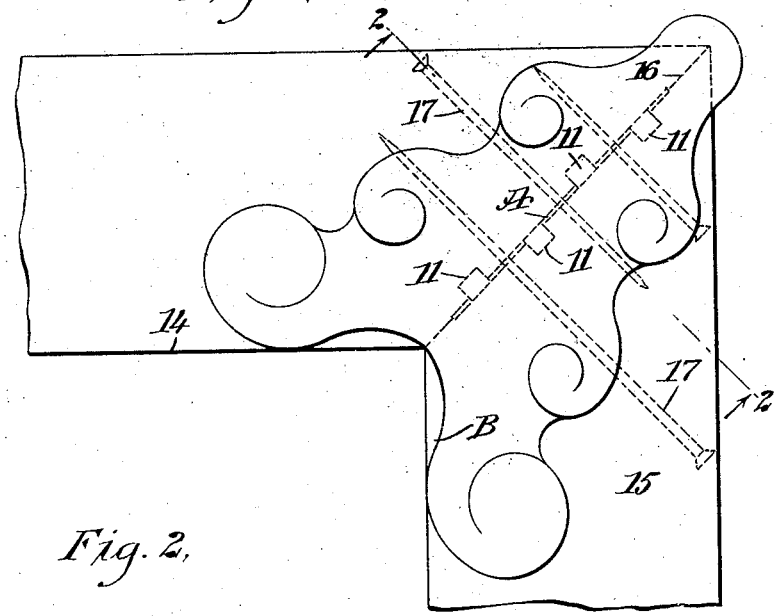
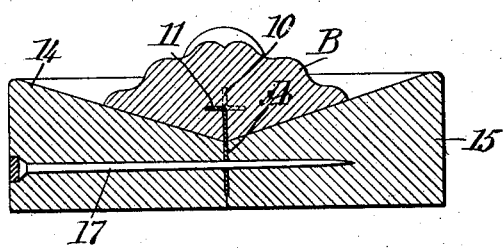
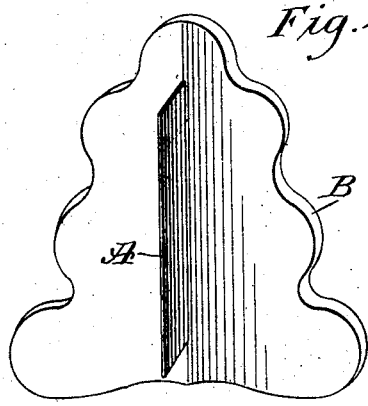
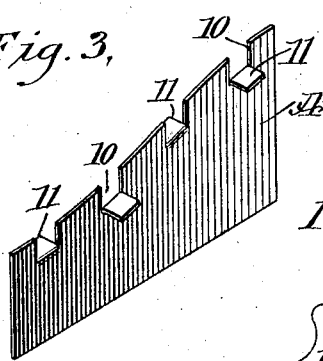
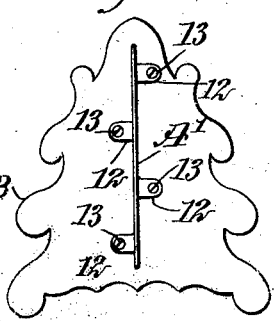
WITNESSES:
Edward Thorpe.
INVENTOR
John L. Paul
BY
Munn & Co
ATTORNEYS
THE NORRIS PETERS CO., WASHINGTON, D. C.

UNITED STATES PATENT OFFICE.

JOHN LAURENE PAUL, OF CHICAGO, ILLINOIS.

FASTENING DEVICE FOR ORNAMENTS.

No. 845,570.   Specification of Letters Patent.   Patented Feb. 26, 1907.

Application filed March 31, 1906. Serial No. 309,092.

*To all whom it may concern:*

Be it known that I, JOHN LAURENE PAUL, a citizen of the United States, and a resident of Chicago, in the county of Cook and State of Illinois, have invented a new and Improved Fastening Device for Ornaments, of which the following is a full, clear, and exact description.

The purpose of my invention is to provide a very simple, economic, and secure fastening device for ornaments adapted for application at the seam in any piece of metal work or cabinet work to cover the seam, being particularly for use on picture-frames, the application being made without danger of marring the ornament or the article to which it is applied.

Another purpose of the invention is to so construct the fastening device that molding manufacturers will be enabled to make a variety of ornamental coverings suitable for any style of moldings to cover unsightly seams or joints, which ornaments are provided with an invisible fastening which not only obviates the breaking of the ornament in applying, but also obviates the unsightly appearance of screws or nails on the surface, as the device is held in position by the same means employed for connecting the members of the frame or article where such members abut.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of a corner of the frame and an ornament secured thereto by the improved fastener. Fig. 2 is a section taken practically on the line 2 2 of Fig. 1. Fig. 3 is a detail perspective view of the fastening device. Fig. 4 is a perspective view of the fastening device applied to an ornament viewed from the bottom; and Fig. 5 is a detail plan view of the fastening device and an ornament, illustrating another means of application to the latter.

The fastening device consists of a strip A of papier-mâché or other material having the required thickness, which strip may be of the same width throughout its length or may be made of varying width, according to the sectional shape of the ornament B in connection with which it is to be used. When the ornament B is to be cast or molded upon the fastening device, the strip A is provided with a series of recesses 10 in its upper edge, and the material displaced in the formation of the recesses 10 is bent in direction of opposite sides of the strips, forming tongues 11, preferably horizontal, as illustrated in Fig. 3. When the ornament B is of wood, metal, or a like material, a strip A' is employed, having horizontal tongues 12 formed at its upper edge, extending beyond both of its faces, and these tongues are secured to the under side of the ornament B by screws 13 or their equivalents. When the ornament B is molded or cast around the upper edge of a strip A, the tongues 11, which usually extend alternately beyond opposite sides of the strip, serve as anchors and effectually hold the strip rigidly to the ornament. Before the members 14 and 15 of the frame, for example, are brought together, that portion of the strip A or A' extending from the ornament is introduced into the space 16 between such members and the same nails or screws 17 utilized to fasten the members 14 and 15 together in passing through the strip A or A' securely hold it fast, and the ornament carried thereby need not be marred in attaching it and will not only conceal the seam, but also the means employed for holding the ornament in place. When the strip A or A' is in place on an ornament, it acts as an attaching-web therefor.

Having thus described my invention, I claim as new, and desire to secure by Letters Patent—

1. An ornament for frames, and the like, provided with an attaching-web of stiff material embedded at its upper portion in the ornament, the exposed portion of the web extending beyond the back of the ornament being adapted to enter the seam the ornament is to conceal.

2. The combination with opposing members of a frame or like structure, of an ornament adapted to cover the point of juncture of said members, a web partially embedded at one of its longitudinal edges in the said ornament and extending from the under face of the ornament into the space between said members, and an attaching device passed through the members of the frame and through the said web.

3. A fastening device for ornaments, consisting of a strip of metal having horizontal tongues extending from its upper edge alternately beyond both of its side faces, and an ornament in which the said tongues are embedded.

4. A fastening device for ornaments, consisting of a strip of stout material having recesses produced in its upper edge and the material displaced by the formation of said recesses carried in opposite directions at an angle to the side faces of the strip, forming anchoring-tongues, and an ornament of flexible material in which the said tongues are embedded and from which the body of the said strip extends, for the purposes described.

In testimony whereof I have signed my name to this specification in the presence of two subscribing witnesses.

JOHN LAURENE PAUL.

Witnesses:
 HATTIE P. WHIPPLE,
 M. L. DODEZ.